United States Patent
Nystrom et al.

(10) Patent No.: US 10,252,525 B2
(45) Date of Patent: Apr. 9, 2019

(54) LEAD-FREE PIEZO PRINTHEAD USING THINNED BULK MATERIAL

(71) Applicants: Xerox Corporation, Norwalk, CT (US); Brown University, Providence, RI (US)

(72) Inventors: Peter J. Nystrom, Webster, NY (US); Gary D. Redding, Victor, NY (US); Angus Ian Kingon, Warren, RI (US); Seunghyun Kim, Bristol, RI (US); Nicholas Mostovych, Providence, RI (US)

(73) Assignees: Xerox Corporation, Norwalk, CT (US); Brown University, Providence, RI (US)

( * ) Notice: Subject to any disclaimer, the term of this patent is extended or adjusted under 35 U.S.C. 154(b) by 0 days.

(21) Appl. No.: 15/611,179

(22) Filed: Jun. 1, 2017

(65) Prior Publication Data
US 2018/0345670 A1     Dec. 6, 2018

(51) Int. Cl.
*B41J 2/14* (2006.01)
*B41J 2/16* (2006.01)
*C04B 35/475* (2006.01)
*C04B 35/453* (2006.01)

(52) U.S. Cl.
CPC ....... *B41J 2/14233* (2013.01); *B41J 2/14201* (2013.01); *B41J 2/161* (2013.01); *C04B 35/453* (2013.01); *C04B 35/475* (2013.01); *C04B 2235/768* (2013.01)

(58) Field of Classification Search
CPC .............. B41J 2/14233; B41J 2/14201; C04B 35/453; C04B 35/475; C04B 2235/768
See application file for complete search history.

(56) References Cited

U.S. PATENT DOCUMENTS

| | | |
|---|---|---|
| 5,790,156 A | 8/1998 | Mutton et al. |
| 6,592,216 B2 | 7/2003 | Slenes et al. |
| 9,139,004 B2 | 9/2015 | Redding et al. |
| 2007/0138906 A1* | 6/2007 | Tsukamoto .......... B41J 2/14233 310/311 |
| 2010/0045740 A1 | 2/2010 | Andrews et al. |
| 2011/0216135 A1* | 9/2011 | Yonemura ............. C04B 35/462 347/71 |

* cited by examiner

*Primary Examiner* — Geoffrey S Mruk
(74) *Attorney, Agent, or Firm* — Fay Sharpe LLP

(57) ABSTRACT

An apparatus for a lead-free piezoelectric ink-jet printhead is disclosed. Piezoelectric printheads, while more expensive are favored because they use a wider variety of inks. The piezoelectric printhead includes a diaphragm, a plurality of piezoelectric actuators comprising a lead-free piezoelectric material, at least one nozzle, at least one ink chamber, a top electrode, and a drive circuit. The deflection of the diaphragm on the body chamber contributes to a pressure pulse that is used to eject a drop of liquid from the nozzle. According to an exemplary embodiment, a lead-free piezoelectric printhead operated at smaller thicknesses and significantly higher electric fields is disclosed, along with methods of making such printheads.

13 Claims, 16 Drawing Sheets

LEAD-FREE PIEZO PRINTHEAD USING THINNED BULK MATERIAL

TECHNICAL FIELD

The present application is related to the field of ink-jet printing devices and more particularly to methods and structures for a lead-free piezoelectric ink-jet printhead.

BACKGROUND

Drop on demand ink-jet technology is widely used in the printing industry. Printers using drop on demand ink-jet technology may use a plurality (i.e. an array) of electrostatic actuators, piezoelectric actuators, or thermal actuators to eject ink from a plurality of nozzles in an aperture plate (nozzle plate). Even though they are more expensive to manufacture than thermal ink jets, piezoelectric ink jets are generally favored, for example, because they can use a wider variety of inks.

Piezoelectric ink-jet printheads include an array of actuators (i.e. piezoelectric elements or transducers), which are selectively operated to eject ink onto a print medium to form a printed image. Piezoelectric ink-jet printheads generally also include a flexible diaphragm to which the array of piezoelectric elements is bonded, and an adjacent body chamber or ink chamber. The diaphragm may be a metal layer that functions as a lower electrode that is common to a plurality of actuators, or a non-metal layer coated with a metal layer that provides an individual, electrically conductive lower electrode for each actuator. When a voltage is applied across one of the actuators, the actuator bends or deflects, causing the diaphragm to flex, which may either fill the body chamber with ink or eject a quantity of ink from the chamber through a nozzle, depending on the polarity of the electrical signal.

Generally, each actuator is aligned with each body chamber and nozzle. Thus, one method of improving the printing resolution of an ink-jet printer employing piezoelectric ink-jet technology is by increasing the density of the actuators and their corresponding nozzles.

However, forming ink-jet printheads becomes increasingly more difficult with decreasing actuator sizes and thicknesses. While microelectronic fabrication of printhead structures would provide precise control of the resulting structures, such methods are volume sensitive and capital intensive, which may preclude their use for low volume or custom products.

Alternatively, current piezoelectric ink jet printheads may use a bulk piezo transducer material, such as lead zirconate titanate (PZT) system that is between 50 µm and 100 µm thick, bonded to stainless steel diaphragms that are between 20 µm and 40 µm thick and square or parallelogram body chambers with dimensions on the order of 400 to 800 µm per side. Such bulk piezo material is typically pre-cut and then bonded to the diaphragm using an epoxy process. Many current printheads use the lead-containing PZT material, which is non-green but is currently permitted by the Restriction of Hazardous Substances Directive under exemptions that will eventually expire. Thus, lead-free piezo materials for printhead applications are desirable.

One lead-free bulk actuator material alternative to PZT is a bismuth sodium potassium titanate (BNKT) based material system. When operated at high electric fields, a BNKT-based lead-free piezo material can give good actuator performance.

However, in order to produce such high electric fields using reasonable voltage levels (less than 100 to 120 volts peak-to-peak), the material must be significantly thinner than is currently used. Moreover, the BNKT-based lead-free actuator materials that are thin enough to be used in printheads are also too thin and fragile to be manufactured and handled in a free-standing state, then diced and bonded using existing methods.

Thus, new lead-free piezoelectric printheads and methods for making such printheads are desirable.

INCORPORATION BY REFERENCE

The following references, the disclosures of which are incorporated herein by reference in their entireties, are mentioned:

U.S. Pat. No. 6,955,419, issued Oct. 18, 2005, by Andrews et al., entitled "INK JET APPARATUS";

U.S. Pat. No. 6,987,348, issued Jan. 17, 2006, by Buhler et al., entitled "PIEZOELECTRIC TRANSDUCERS";

U.S. Pat. No. 7,048,361, issued May 23, 2006, by Schmachtenberg, III et al., entitled "INK JET APPARATUS"; and U.S. patent application Ser. No. 14/851,422 filed Sep. 11, 2015 entitled "INTEGRATED THIN FILM PIEZOELECTRIC PRINTHEAD"; and U.S. patent application Ser. No. 15/141,229, filed Apr. 28, 2016, entitled "INTEGRATED PIEZO PRINTHEAD", incorporated herein by reference in their entirety.

BRIEF DESCRIPTION

In one embodiment of this disclosure, described is a piezoelectric ink-jet printhead comprising: a diaphragm; a plurality of piezoelectric actuators wherein each actuator comprises a lead-free piezoelectric material, a first electrode adjacent to a first side of the piezoelectric material, and a second electrode adjacent to a second side of the piezoelectric material; at least one nozzle; at least one body chamber; and a drive circuit that generates an electrical signal across one or more of the plurality of piezoelectric actuators.

In another embodiment of this disclosure, described is a method for fabricating a piezoelectric ink-jet printhead comprising a lead-free piezoelectric material, the method comprising: bonding a piezoelectric material to a diaphragm-plus-body assembly, wherein the piezoelectric material is plated with a first electrode material on a first side prior to bonding; thinning the piezoelectric material to a first thickness; plating the piezoelectric material on a second side with a second electrode material; and dicing the piezoelectric material into printhead sized pieces. In particular embodiments, the method further comprises plating the piezoelectric material on a first side with a first electrode material prior to bonding the piezoelectric material to a diaphragm-plus-body assembly.

In still another embodiment of this disclosure, described is a method for fabricating a piezoelectric ink-jet printhead comprising a lead-free piezoelectric material, the method comprising: mounting a piezoelectric material onto a first intermediate substrate, wherein the piezoelectric material is plated on a first side with a first electrode material prior to mounting; thinning the piezoelectric material to a first thickness; plating the piezoelectric material on a second side with a second electrode material; dicing the plated piezoelectric material into individual actuators; and bonding the diced piezoelectric actuators to a diaphragm-plus-body assembly.

In particular embodiments, the method further comprises plating a first side of the piezoelectric material with a first electrode material prior to mounting the piezoelectric material onto the first intermediate substrate.

In further embodiments, the method also comprises: mounting the plated piezoelectric material onto a second intermediate substrate after plating the piezoelectric material on a second side with a second electrode material; and unmounting the plating piezoelectric material from the first intermediate substrate.

BRIEF DESCRIPTION OF THE DRAWINGS

The exemplary embodiments may take form in various components and arrangements of components, and in various steps and arrangements of steps. The drawings are only for purposes of illustrating the preferred embodiments and are not to be construed as limiting the present exemplary embodiment.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same or like parts.

As used herein, unless otherwise specified, the word "printer" encompasses any apparatus that performs a print outputting function for any purpose, such as a digital copier, bookmaking machine, facsimile machine, a multi-function machine, electrostatographic device, etc.

According to an exemplary embodiment described herein, provided is a lead-free piezoelectric printhead system that retains the use of existing low-cost adhesive-based jet stack fabrication processes with polymers and metal layers. A jet stack generally comprises a plurality of plates or membranes that form channels through which ink flows into an ink or body chamber and out through a nozzle. The approach described herein avoids the cost and complexity of a MEMS-based fabrication process, and provides a lead-free alternative to current lead-containing printhead technologies. Here, relatively thick bulk lead-free piezoelectric material is bonded to a diaphragm or a diaphragm-plus-body assembly, then thinned to the desirable thickness range in accordance with the present teachings.

Figure 1:
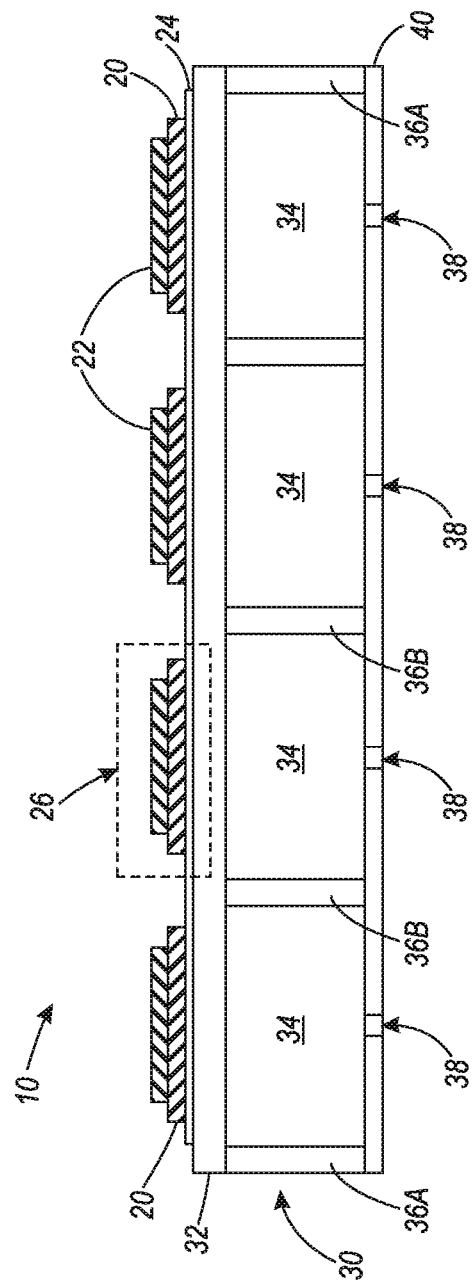
FIG. 1 depicts an exemplary embodiment of a piezoelectric printhead.

As shown in FIG. 1, provided is a piezoelectric printhead array structure 10, the structure including an array of individual actuators 26 bonded to a diaphragm-plus-body assembly 30. The assembly 30 includes a diaphragm 32, a plurality of body or ink chambers 34 enclosed by walls 36, an aperture plate 40, and a plurality of nozzles 38. Walls 36 may be an external wall 36A with at least one side not facing or in contact with interior of the ink chambers 34, or may be an internal wall 36B, with at least two sides forming the sides of the ink chamber 34. Each individual actuator 26 is bonded to the diaphragm 32, and comprises a top electrode 22, a bottom electrode 24, and a piezoelectric material 20. Generally, each actuator 26 is aligned with a single ink chamber 34 and nozzle 38 as shown. In particular embodiments, the bottom electrode 24 can be common to a plurality of individual actuators 26, as shown in FIG. 1.

According to an exemplary embodiment, the piezoelectric material 20 is a lead-free formulation comprising bismuth sodium potassium titanate (BNKT). In particular embodiments, the BNKT is an oxide (Bi—Na—K—Ti—O), i.e. an oxide that may be of the composition $Bi_vNa_wK_xTi_yO_z$, where "v" ranges from 0 to 0.5 (i.e., 0~0.5, where the range of the Bi component is from 0 to 0.5 mol), "w" is in the range of about 0.5~1, "x" is in the range of about 0~0.5, "y" is in the range of about 0.5~1, and "z" is in the range of about 1.5~3.5.

In various embodiments, the piezoelectric material 20 may further comprise one or more additional compounds, such as bismuth magnesium titanate (BMT) and niobium potassium sodium (KNN). BMT and KNN may be oxides (i.e. have the formulation Bi—Mg—Ti—O and K—Na—Nb—O respectively). In particular embodiments, BMT may be in the form $Bi_aMg_bTi_cO_d$, where "a" is in the range of from about 0.5~1, "b" is in the range of from about 0~0.5, "c" is in the range of from about 0~0.5, and "d" is in the range of from about 1.5~3.5. In further embodiments, KNN may be in the form of $K_eNa_fNb_gO_h$. where "e" is in the range of from about 0~0.6, "f" is in the range of from about 0~0.6, "g" is in the range of from about 0.5~1.5, and "h" is in the range of from about 1.5~3.5.

In various embodiments, the lead-free piezoelectric material 20 comprises between 90 and 100 mol % of BNKT, or between 95 and 100 mol % BNKT, or between 90 and 99.9 mol % BNKT, or between 95 and 99.9 mol % BNKT.

In various embodiments, the lead-free piezoelectric material 20 comprises between 90 and 100 mol % of KNN, or between 95 and 100 mol % KNN, or between 90 and 99.9 mol % KNN, or between 95 and 99.9 mol % KNN.

In further embodiments, the lead-free piezoelectric material 20 comprises between 0 and 10 mol % of an additive, such as BMT or KNN, or between 0 and 5 mol % of an additive, or between 5 and 10 mol % of an additive.

According to an exemplary embodiment, the piezoelectric material 20 in a completed ink-jet printhead 10 may have a thickness of from about 2 μm to about 50 μm, or from about 4 μm to about 45 μm, or from 8 μm to about 40 μm, or preferably from about 10 μm to about 20 μm.

In various embodiments, the diaphragm 32 may be composed of a metal, a polymer, a ceramic, glass, or silicon. In particular embodiments, the diaphragm is composed of steel.

According to an exemplary embodiment, the diaphragm 32 in a completed ink-jet printhead 10 may have a thickness of from about 2 μm to about 30 μm, or from about 4 μm to about 28 μm, or from about 10 μm to about 25 μm. In particular embodiments, the thickness of the diaphragm 32 is from about 10 μm to about 25 μm.

In particular embodiments, the piezoelectric material may be plated on one or more sides with one or more electrode material compositions. For example, the piezoelectric material may be plated on a first side with a first electrode material, and plated on a second side with a second electrode material. In particular embodiments, the one or more electrode materials may be identical. In other embodiments, the one or more electrode materials may be different. In some embodiments, the electrodes 22, 24 may comprise a metal, such as copper, gold, titanium, nickel, platinum, chromium, aluminum, or a metal alloy such as Pt—Pd or Ag—Pd, or an electrically conductive non-metal. The electrodes 22, 24 may have a thickness of from about 100 nm (0.1 μm) to about 1100 nm (1.1 μm). The electrode layers 22, 24 may be formed using sputtering, chemical vapor deposition, electroplating, or another suitable process.

The remainder of the diaphragm-plus-body assembly or jet stack 30, including the aperture plate 40, walls 36, nozzles 38, ink inlet 50 (FIG. 3), and body chambers 34 may be made in accordance with common practices known in the art. The completed printhead may include other ink chambers, ink paths, ink reservoirs, electrical structures that serve as drive electronics, or other electrical or mechanical structures related to the functionality, appearance, or attachment of the printhead.

Figure 2:
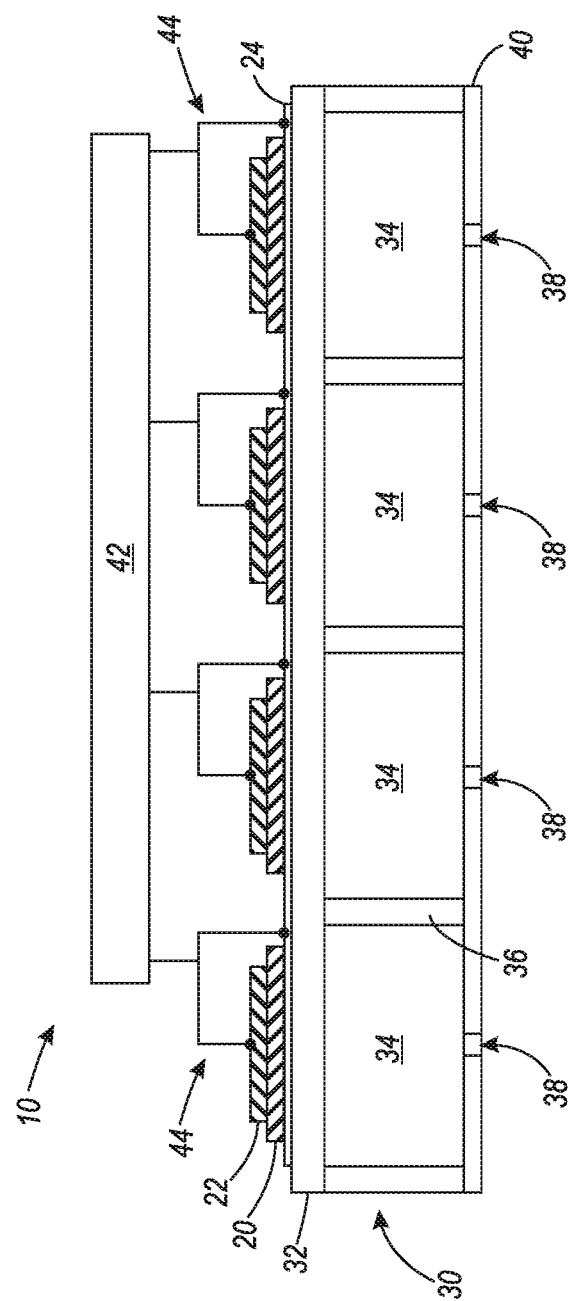
FIG. 2 depicts an exemplary embodiment of a piezoelectric printhead with an attached drive circuit.

As shown in FIG. 2, a drive circuit 42 applies electrical signal via connections 44 between the top plate (or top electrode) 22 and the bottom electrode 24. Additionally, when the actuators are bonded to the diaphragm 32, the diaphragm 32 also acts as a common plane for a plurality of the printhead actuators 26. In particular embodiments, the drive circuit 42 may comprise an application-specific integrated circuit (ASIC) that provides control functions over groups of actuators, as well as specific circuitry to drive the response of the piezoelectric system. The electrical signal energizes the lead-free piezoelectric material 20, which causes the piezoelectric material 20 and diaphragm 32 to deflect, or bend, over the associated ink chamber 34 creating a pressure pulse within the chamber 34. Depending on the electrical signal generated by the drive circuit 42, the actuators 26 deflect in one direction to draw ink into the body chamber 34, or deflect in another direction to eject ink in the body chamber 34 out through the nozzle 38.

According to an exemplary embodiment, each actuator 26 may be individually addressed by one or more drive circuits 42 via connections 44, allowing each actuator 26 to be operated independently. Addressing individual actuators 26 may be accomplished by a number of means, including blanket metal scribing, etching individual actuators 26, chemical etching, or patterning to form electrodes directly. In particular, the patterning can include mechanical sawing (i.e. dicing), scribing and then breaking, laser cutting, waterjet cutting, and other mechanical singulation of the individual actuators 26.

Figure 3:
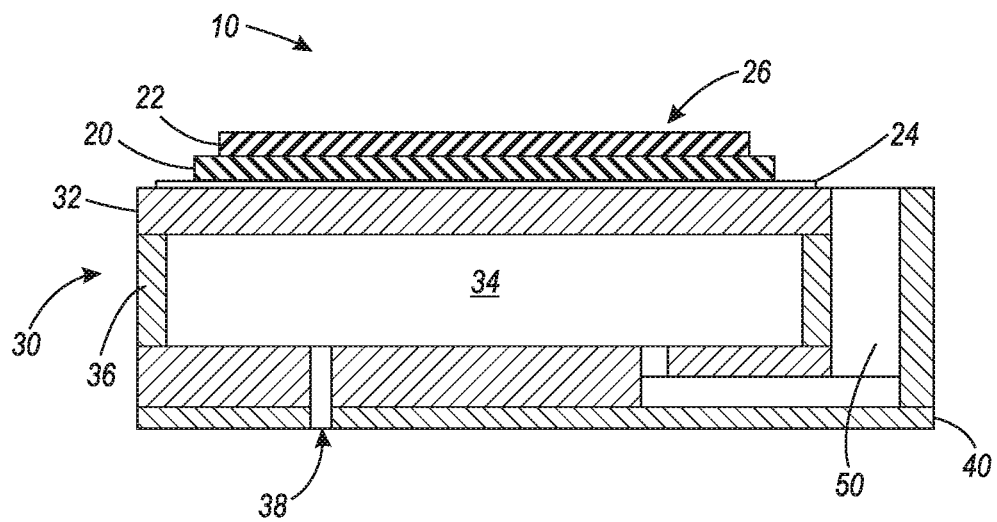
FIG. 3 depicts an exemplary embodiment of a piezoelectric printhead from a different perspective.

With reference to FIG. 3, a side-view cross-section of an ink-jet printhead showing an individual actuator 26 and diaphragm-plus-body assembly 30 is illustrated. As shown, the diaphragm-plus-body assembly may further include an ink inlet 50, which allows ink to move from an ink source (not shown) through the inlet 50 and into the body chamber 34. As discussed above, the drive circuit 42 (FIG. 2) generates an electrical signal or voltage across the piezoelectric material 20, causing the diaphragm 32 to deflect in a particular direction. Depending on the electrical signal applied, the diaphragm may deflect and cause ink from an ink source (not shown) to be drawn through an ink inlet 50 into the body chamber 34 associated with that actuator 26. Alternatively, the electrical signal generated may cause the diaphragm 32 to deflect and cause ink in the body chamber 34 associated with that actuator 26 to be ejected out of the nozzle 38.

Figure 4:
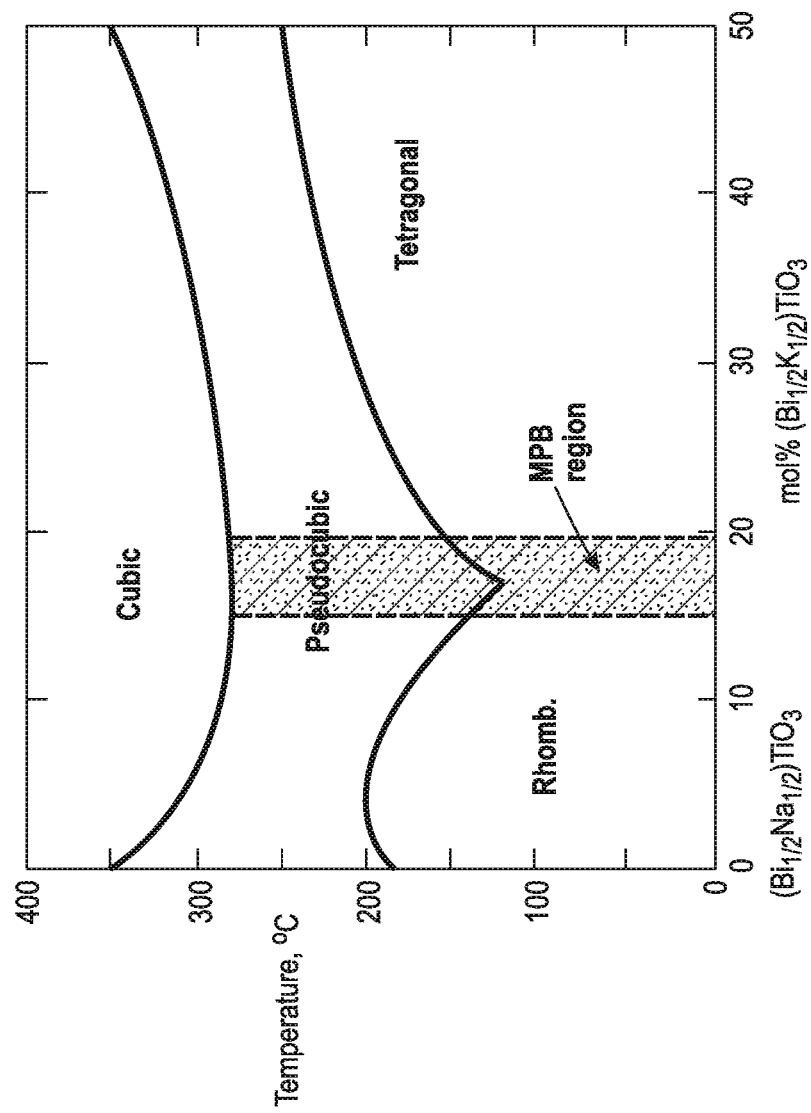
FIG. 4 is a phase diagram for the typical BNKT morphotropic system, specifically for the $(Bi_{1/2}Na_{1/2})TiO_3$—$(Bi_{1/2}K_{1/2})TiO_3$ solid solution.

With reference to FIG. 4, a phase diagram for the typical BNKT morphotropic system, specifically for the $(Bi_{1/2}Na_{1/2})TiO_3$—$(Bi_{1/2}K_{1/2})TiO_3$ solid solution, is shown. Piezoelectric compositions, such as PZT and the lead-free systems discussed herein, are typically chosen to be close to a morphotropic boundary (MPB) in order to improve poling and net piezoelectric displacement. During normal operation of a piezoelectric printhead, the piezoelectric material would be poled, and the actuator would be operated with positive and negative pulses to control both the reservoir (i.e. body chamber 34) levels and ejection. Piezoelectric materials contain Weiss domains (regions of locally aligned dipoles) that may randomly oriented (and therefore exhibit no net piezoelectric effect or displacement), but become aligned by poling the material. During poling, a very strong electric field is applied across the material, which orients all the dipoles in the direction of the field. After the electric field is removed, the dipoles of the material generally remain roughly oriented with the electric field that was applied, but may become de-poled if it is subjected to another high electric field (i.e. an electric field above the coercive field level) in a different direction, or if the material is exposed to a temperature above the Curie temperature (i.e. de-poling temperature).

However, as compared to PZT, the traditional ink-jet printhead piezoelectric material, the lead-free BNKT system including BNKT-BMT and BNKT-KNN systems have high electric field responses with significantly different electromechanical behavior. The disclosed systems require higher electric fields and operation close to or above the coercive fields of traditional materials. In the currently described systems, no traditional poling is required, and the issues of de-poling and proximity of the de-poling temperature are not a concern. However, in any piezoelectric printhead system, the electromechanical behavior is important because the pressure pulse created by the deflection of the piezoelectric material and the diaphragm must be sufficient to achieve a reasonable ink ejection power and drop speed. In other words, the electrical signal generated across the piezoelectric material must be sufficient to generate a pressure pulse that both quickly draws ink into the ink chamber and quickly ejects ink in the ink chamber out through the nozzle.

According to an exemplary embodiment, the higher operating fields can induce larger displacements. However, as these operating fields may be above the coercive fields for the lead-free composition, the lead-free piezoelectric composition may be altered with an additive. In particular embodiments, a lead-free piezoelectric material comprising BNKT may be modified with BMT or KNN, which provides flexibility in the operation of the actuator and optimizes the actuators in conjunction with the electrical drive circuit and drive conditions. Specifically, the addition of an additional compound, such as BMT, can lower the transition temperature to the pseudo-cubic (or relaxor) phase seen in FIG. 4. This phase is not piezoelectric under ambient conditions, but a field-induced transition to a piezoelectric phase can occur upon the application of an electric field. This allows for a greater net change in polarization and displacement (i.e. deflection) as compared to the unmodified BNKT. When the electric field is removed, the polarization and displacement then go back to zero.

However, while BNKT-BMT piezoelectric composition gives the advantage of larger net displacements, which is important for fluid ejection, the displacement is always in the same direction (as in an electrostrictive material). In order for the drive circuit to deflect the membrane (i.e. diaphragm) in the opposite direction, one of two strategies can be employed: (1) a DC bias mode; (2) a mixed-mode.

Figure 5A:
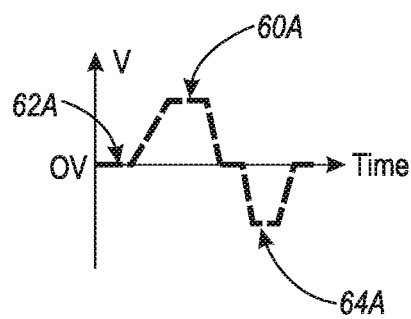
FIGS. 5A-5C illustrate potential electrical signals or bias waveforms that may be applied by the drive circuit according to an embodiment of the present teachings.
Figure 5B:
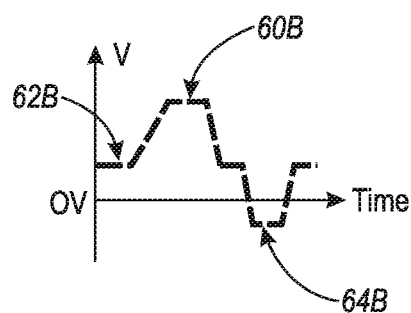
Figure 5C:
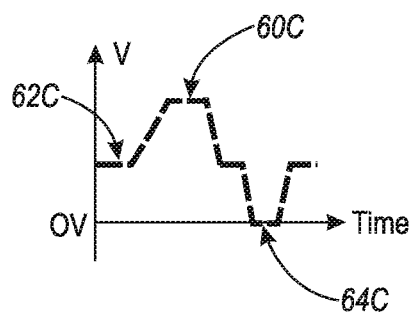

In the DC bias mode, the piezoelectric material may be operated under a DC bias, as illustrated in FIGS. 5A-5C. With reference to FIGS. 5A, 5B, and 5C, a traditional bi-directional waveform, a waveform with partial bias, and a waveform with full bias are shown respectively. As shown in FIG. 5A, the electrical signal is a traditional bi-directional waveform, with a starting value 62A of zero volts (i.e. zero bias), a positive peak 60A and a negative peak 64A. Similarly, FIGS. 5B and 5C have positive peaks 60B and 60C, and negative peaks 64B and 64C, respectively. However, unlike FIG. 5A, FIGS. 5B and 5C have a bias voltages 62B and 62C, respectively. In particular embodiments, the electrical signal generated across the one or more of the plurality of piezoelectric actuators 26 has a bias such that the voltage level in one direction is at least 1.5 times the absolute value of the voltage applied in the opposite direction (i.e. peak 60B, 60C is at least 1.5 times the absolute value of peak 64B, 64C). In other embodiments, the electrical signal has a bias such that the voltage level applies in one direction is at least 2 times the absolute value of the voltage applied in the opposite direction. In still further embodiments, the electrical signal generated across the piezoelectric actuators 26 may have a bias such that the voltage applied is completely in one direction. As used herein, the term "direction" refers to the polarity of the applied voltage. Thus, "one direction" may be a positive voltage, and another "direction negative, and vice versa.

In an exemplary embodiment, the electrical field or signal generated across the one or more of the plurality of the piezoelectric actuators 26 is from about 3 volts to about 10 volts per μm of the piezoelectrical material thickness. For example, in a printhead 10 comprising a plurality of piezoelectric actuators 26 with a lead-free piezoelectric material having a thickness of approximately 20 μm, the electrical signal generated across the actuators 26 by the drive circuit 42 may be from about 60 volts to about 200 volts, in either a positive or negative direction (i.e. ±200 volts). Additionally, if the drive circuit has a bias voltage of, for example, +25 volts, then the drive circuit 42 may apply an electrical signal that ranges from about +225 volts to about −175 volts.

The waveforms shown in FIGS. 5A-5C represent the general types of electrical signals generated by the drive circuit, which can energize the piezoelectric material causing it to deflect in a particular direction. However, other waveforms of various peaks, biases, ranges, durations, and frequencies are also contemplated.

During the DC bias mode of operation, the phase transition of the modified lead-free composition can be used to drive the liquid ejections from the ink chamber, and the fluid levels in the chamber can be controlled by dropping the bias to zero (i.e. negative relative to the bias), which results in displacement in the opposite direction. In other words, the phase transition at or above the bias voltage is used to eject ink from the ink chamber, while dropping the voltage below the bias voltage is used to draw ink from an ink source into the ink chamber through an inlet. In particular embodiments, this mode of operation is used with lead-free compositions, such as BNKT, that have relatively higher levels of additives, such as BMT. For example, in some embodiments, this mode of operation is appropriate for a BNKT-BMT piezoelectric composition containing at least 3 mol % of BMT, or between 3 mol % and 5 mol % of BMT.

In the mixed-mode of operation, the piezoelectric material may be have both piezoelectric and field-induced electromechanical behavior. At lower levels of additives (such as BMT or KNN), the electromechanical behavior of the lead-free composition is mixed. More specifically, the various compositions of BNKT with either BMT or KNN are a mix of piezoelectric and relaxor phases, and thus some pure piezoelectric character is maintained. Therefore, small negative biases, below the piezoelectric coercive field or the field-induced phase transition level, could be used for the negative displacement to set the liquid levels within the ink chamber, while large positive fields that yield the large displacements associated with the field induced phase transition can be used to drive the liquid ejection.

Figure 6:
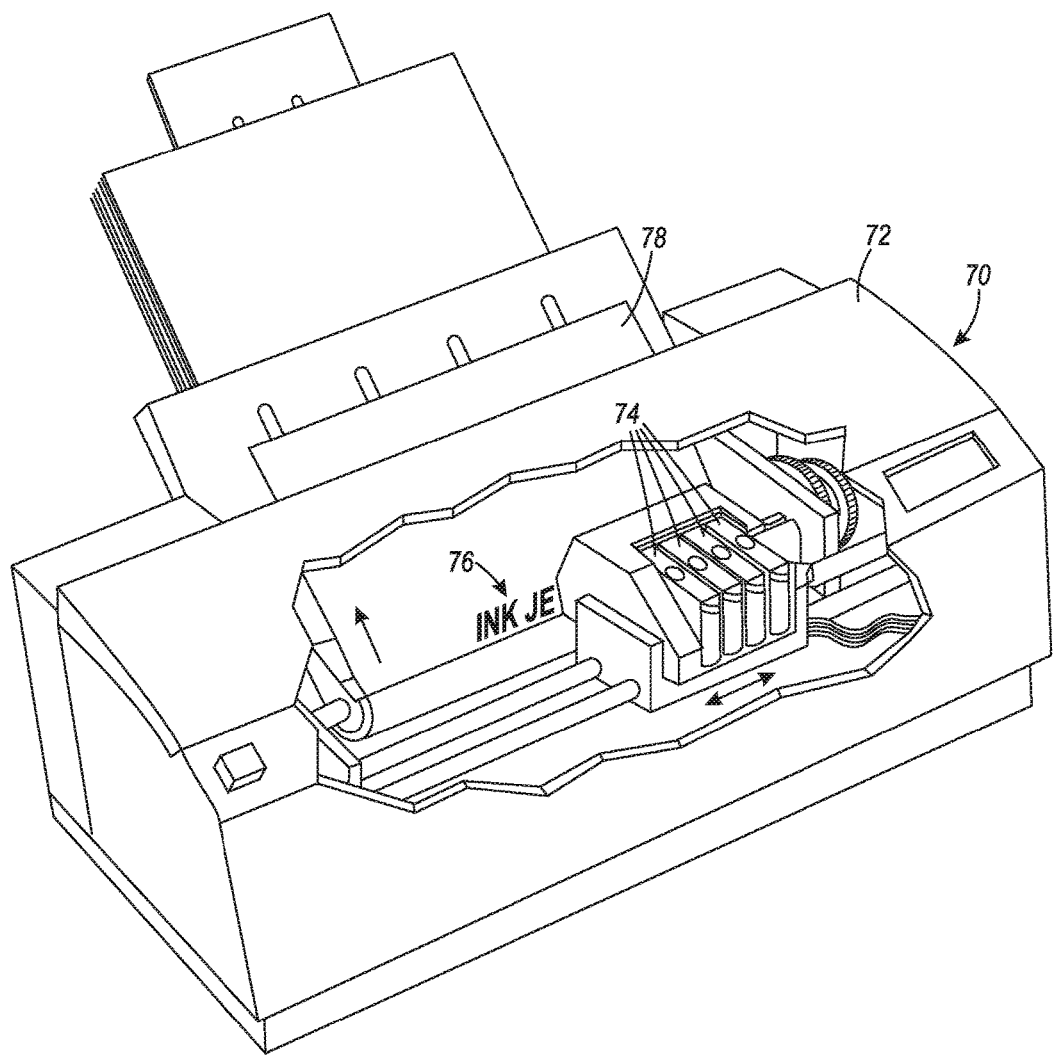
FIG. 6 is a perspective depiction of a printer including a printhead according to an embodiment of the present teachings.

With reference to FIG. 6, a printer 70 is depicted including a printer housing 72 into which at least one printhead 74 embodying the present teachings has been installed. The housing 72 may encase the printhead 74. During operation, ink 76 is ejected from one or more printheads 74. The printhead 74 is operated in accordance with digital instructions to create a desired image on a print medium 78 such as a paper sheet, plastic, etc. In other words, based on the digital instructions, the drive circuits 42 eject ink from the ink chambers 34 onto the print medium 78. The printhead 74 may move back and forth relative to the print medium 78 in a scanning motion to generate the printed image swath by swath. Alternatively, the printhead 74 may be held in a fixed position and the print medium 78 may be moved relative to the printhead(s) 74. The printhead 74 can be narrower than, or as wide as, the print medium 78. In another embodiment, the printhead 74 can print to an intermediate surface, such as a rotating drum or belt (not shown) for subsequent transfer to a print medium.

Figure 7:
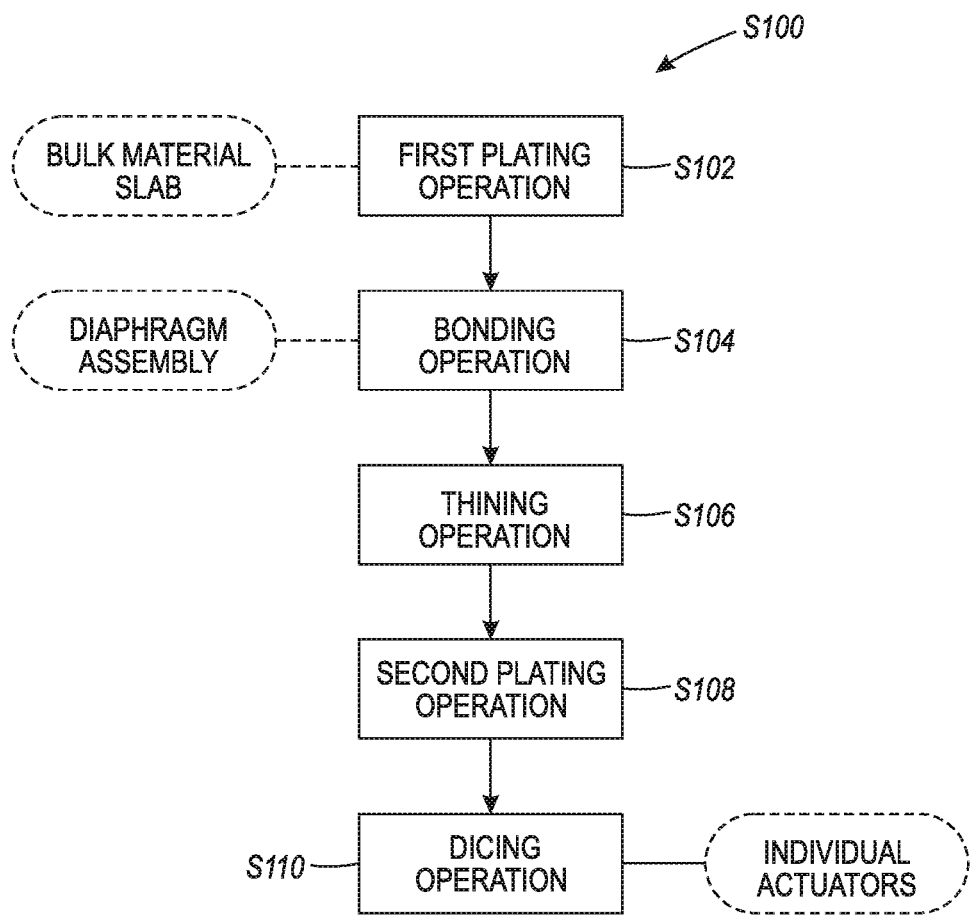
FIG. 7 is a flow chart illustrating an exemplary method of fabricating a lead-free piezoelectric printhead.

With reference to FIG. 7, a flowchart S100 is depicted illustrating a method of fabricating a lead-free piezoelectric ink-jet printhead in accordance with an exemplary embodiment of the subject application.

The method begins with a first plating operation S102, wherein a slab of piezoelectric material 100 is plated on a first side with the bottom electrode material 24. Thus, in step S102, the bottom electrode is formed. The initial thickness of the slab of piezoelectric material may be at least about 50 μm, or at least about 100 μm.

In some embodiments, the plated piezoelectric material may be provided commercially. In such embodiments, the method S100 may begin with step S104, as described below.

In step S104, the plated pieces are permanently bonded to a diaphragm-plus-body assembly (the plated side towards the diaphragm) with an adhesive, or is temporarily bonded to a transfer medium, such as a carrier with double-sided tape or a carrier with a dissolvable/meltable adhesive. In other embodiments, the plated material may be bonded to the diaphragm-plus-body assembly using other methods known in the art.

In step S106, the mounted pieces are thinned in a thinning operation to a thickness using at least one of a precision surface grinder, dicing saw, a polishing wheel, or other mechanical means. In particular embodiments, the piezoelectric material 100 in a completed ink-jet printhead may have a thickness of from about 2 µm to about 50 µm, or from about 4 µm to about 45 µm, or from 8 µm to about 40 µm, or preferably from about 10 µm to about 20 µm. In an exemplary embodiment, the second thickness may be about 20 µm. In particular embodiments, where deflection of the mounted pieces are a concern, a tooled structure (patterned to fit into the body cavities) can be placed behind the diaphragm during the thinning operation to provide support.

After the piezoelectric material 100 has been plated on a first side and thinned to the desired thickness, an electrode 22 can be deposited on a second side of the material 100 in a second plating operation S108. Thus, in this step, an electrode material layer 116 is formed. The electrode layer 116 may be deposited using several methods, including at least plating, sputtering, or evaporation methods. For example, in particular embodiments, radio frequency (RF) sputtering may be used to deposit nickel onto the second side 104 of the piezoelectric material 100. It is contemplated that other methods and electrode materials may be used.

In step S110, the piezoelectric material 100 is separated to form individual actuators. This operation singulates each transducer, creating an individual electrically isolated element. In an exemplary embodiment, the material 100 is diced using a dicing saw to form individual actuators.

With reference to FIGS. 8A-8E, shown is a series of steps associated with producing a printhead structure with a lead-free piezoelectric material according to an exemplary embodiment of this disclosure.

As shown in FIGS. 8A-8E, steps S102-S110 of method S100 are illustrated.

Figure 8A:
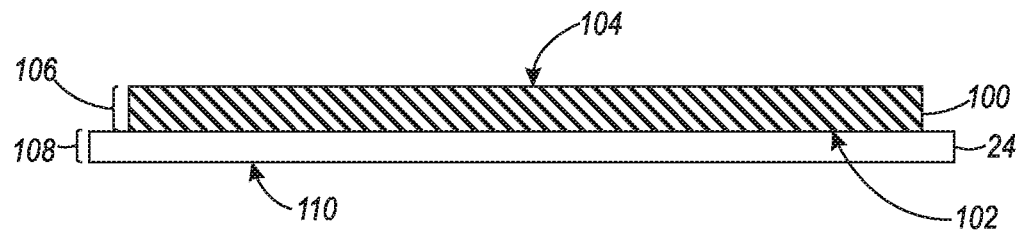
FIGS. 8A-8E illustrate a series of steps used to fabricate a piezoelectric printhead according to an exemplary embodiment of this disclosure.

In FIG. 8A, a relatively thick slab of bulk piezoelectric material 100 is plated on a first side 102 with a bottom electrode material 24, and forms the bottom electrode 24 of the individual actuators 26. In particular embodiments, the piezoelectric material 100 may have an initial thickness 106 of from about 50 µm to about 300 µm, or from about 100 µm to about 300 µm.

Figure 8B:
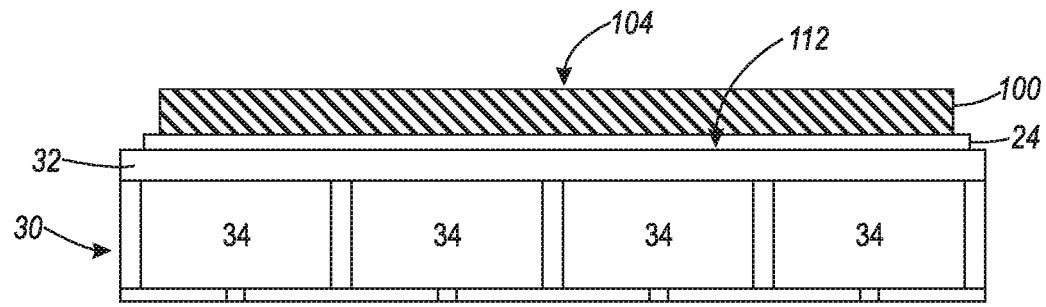

Next, as shown in FIG. 8B, the plated piezoelectric material 100 may be bonded to a first surface 112 of a diaphragm-plus-body assembly 30. In particular embodiments, the plated piezoelectric material 100 is bonded to the diaphragm 32 by bonding a first surface 110 of the bottom electrode material 24 to the first surface 112 of the diaphragm 32. In particular embodiments, the plated piezoelectric material 100 may be bonded with an adhesive, or may be bonded to the diaphragm-plus-body assembly using other methods known in the art.

Figure 8C:
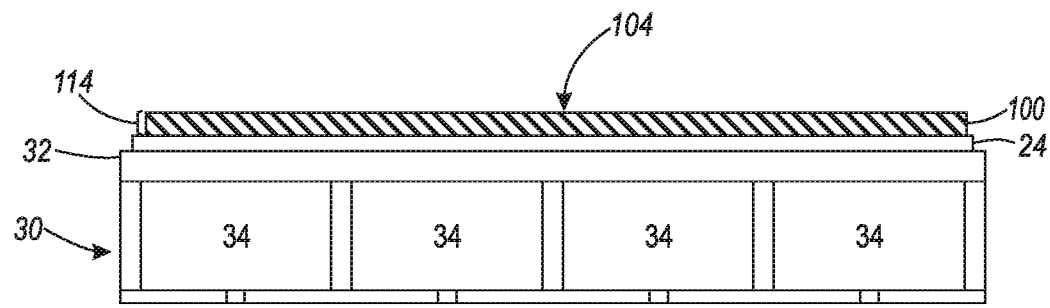

Next, as shown in FIG. 8C, the piezoelectric material 100 is thinned to a second thickness 114. The piezoelectric material 100 can be thinned to a second thickness 114 using at least one of a precision surface grinder, dicing saw, or other mechanical means. In particular embodiments, the second thickness 114 may be from about 2 µm to about 50 µm, or from about 4 µm to about 45 µm, or from 8 µm to about 40 µm, or preferably from about 10 µm to about 20 µm. In particular embodiments, where deflection of the mounted pieces are a concern, a tooled structure (not shown) can be placed behind the diaphragm during the thinning operation to provide support.

Figure 8D:
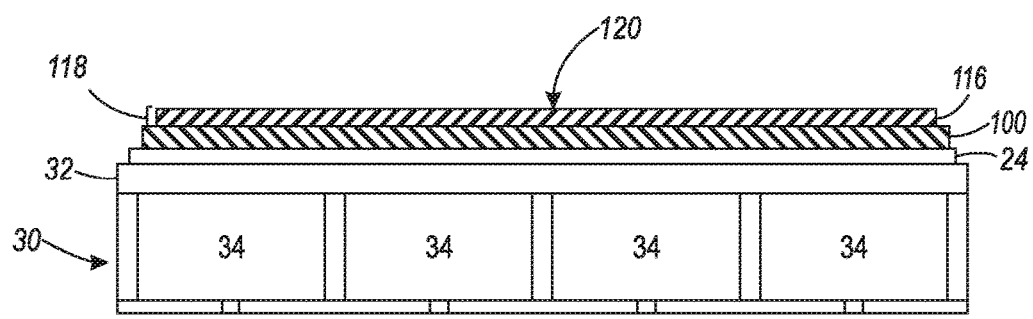

Next, as shown in FIG. 8D, after the material 100 is thinned to a second thickness 114, a top electrode material layer 116 is deposited on at least a portion of a second side 104 (see FIG. 8A) of the material 100. In particular embodiments, the second side 104 of the piezoelectric slab 100 may be plated with the top electrode material 116. In other embodiments, the piezoelectric slab 100 may be selectively plated such that only a portion of the second side 104 is plated. The electrode material 116 may be deposited using several methods, including at least plating, sputtering, or evaporation methods. For example, in particular embodiments, RF sputtering may be used to deposit nickel onto the second side 104 of the piezoelectric material 100 to form the electrode layer. In particular embodiments, the top electrode layer 116 may have a thickness 118 of from about 100 nm (0.1 µm) to about 1100 nm (1.1 µm).

Figure 8E:
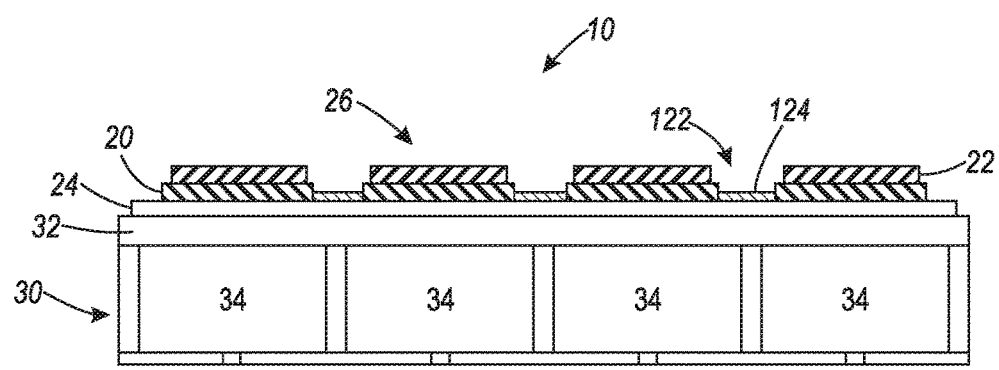

Next, as shown in FIG. 8E, the piezoelectric material 100 is separated into individual actuators 26 to obtain a piezoelectric ink-jet printhead 10. As previously discussed, each having a top electrode 22, a bottom electrode 24, and a lead-free piezoelectric layer 20 disposed between and separating the top and bottom electrodes 22, 24. In an exemplary embodiment, the material 100 is diced into individual actuators 26 using a dicing saw (not shown). In some embodiments, a residual amount of piezoelectric material 124 may remain in the spaces (i.e. dicing streets) 122 between each actuator 26.

Figure 9:
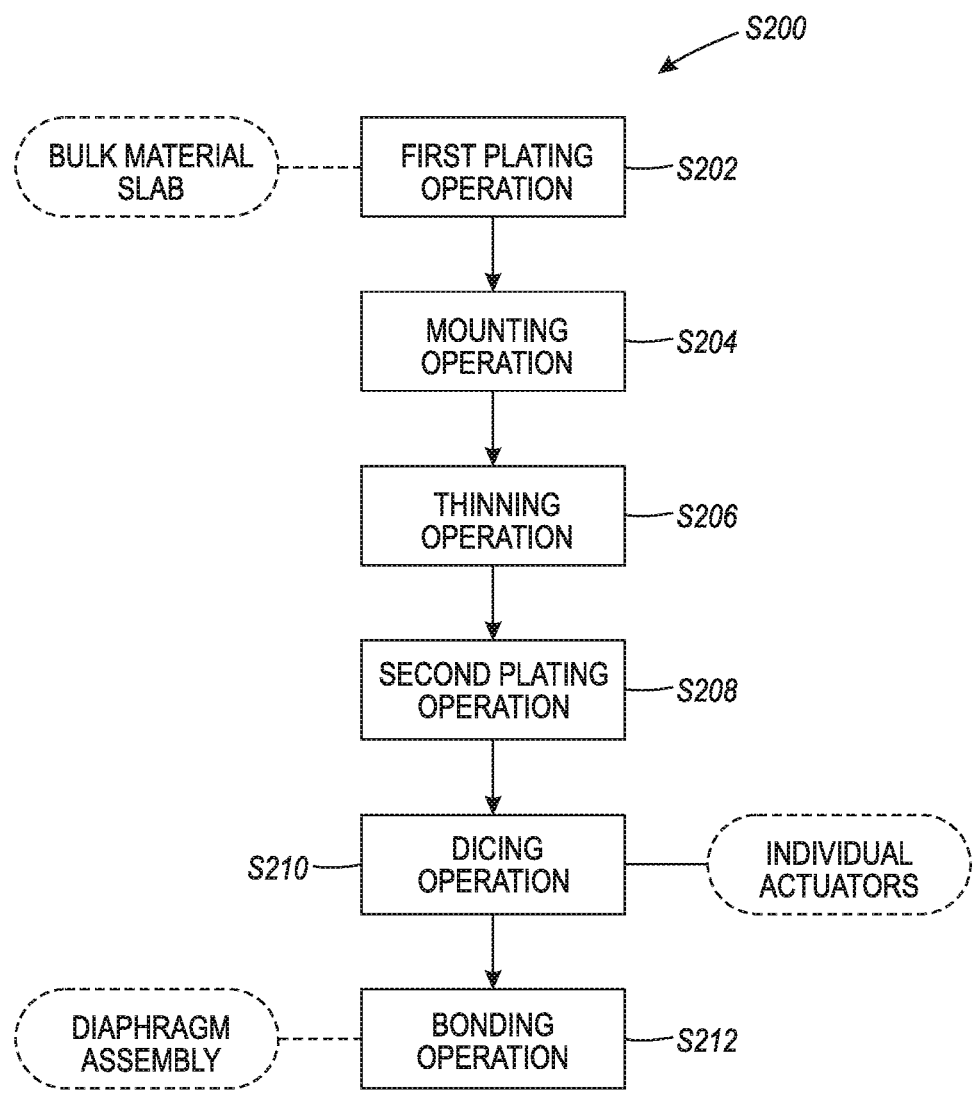
FIG. 9 is a flow chart illustrating a second exemplary method of fabricating a lead-free piezoelectric printhead.
Figure 11:
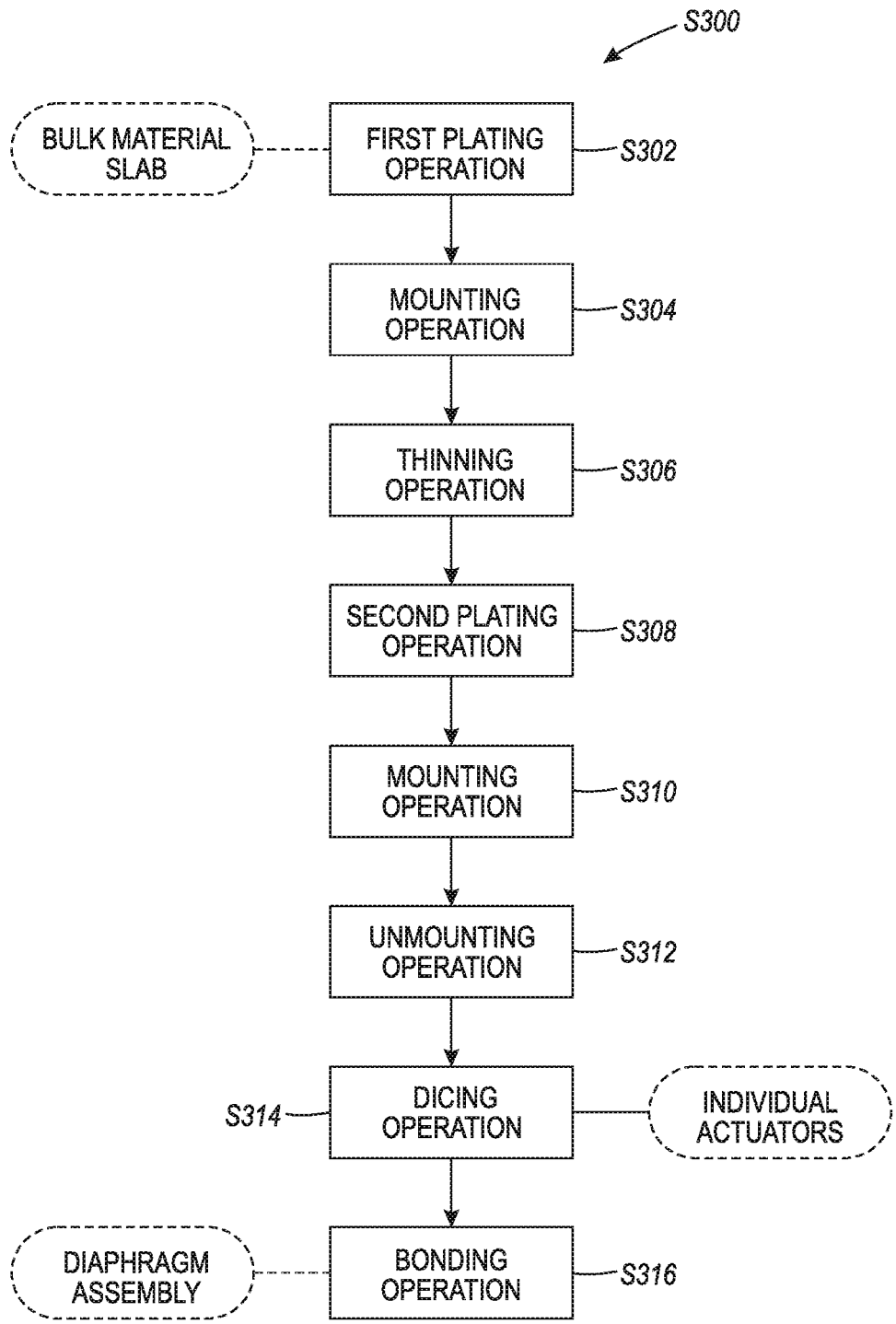
FIG. 11 is a flow chart illustrating a third exemplary method of fabricating a lead-free piezoelectric printhead.

With reference to FIGS. 9 and 11, additional embodiments of the methods of making lead-free piezoelectric printheads 10 described herein are disclosed. Like the methods described in FIG. 7, the lead-free piezoelectric material is plated with an electrode material on one side, then attached to a substrate or device, thinned to a desired thickness, plated on a second side, and diced into individual actuators. In some embodiments, the piezoelectric material with plating on one side may be provided commercially. In such embodiments, the first plating operation steps described herein may be skipped. However, in the particular embodiments discussed below, piezoelectric material may be reversibly mounted onto one or more intermediate substrates, thinned while mounted on said intermediate substrates, and subsequently permanently bonded to a diaphragm of a diaphragm-plus-body assembly.

With reference to FIG. 9, a flowchart S200 is depicted illustrating a method of fabricating a lead-free piezoelectric ink-jet printhead in accordance with a second exemplary embodiment of the subject application. In step S202, a relatively thick slab of bulk piezoelectric material 100 is plated on a first side to form a first electrode layer. In particular, this piezoelectric material 100 may have an initial thickness of from about 100 µm to about 300 µm. Then, in step S204, the plated slab 100 is mounted onto an intermediate substrate, such as a transfer carrier or dicing tape.

In step S206, the piezoelectric material 100 is thinned to the desired thickness while mounted to the intermediate substrate using at least one of a precision surface grinder, dicing saw, or other mechanical means. In particular embodiments, the second thickness (i.e. desired thickness) may be from about 2 µm to about 50 µm, or from about 4 µm to about 45 µm, or from 8 µm to about 40 µm, or preferably from about 10 µm to about 20 µm.

In step S208, a second electrode material layer 116 is deposited on a least a portion of a second side of the material 100. In further embodiments, the piezoelectric slab 100 may be selectively plated such that only a selected portion of the second side of the piezoelectric material 100 is plated. The electrode material layer(s) may be deposited using several methods, including at least plating, sputtering, or evaporation methods. For example, in particular embodiments, RF sputtering may be used to deposit nickel onto the second side of the piezoelectric material 100 to form the electrode layer. In particular embodiments, the electrode layer may have a thickness 118 of from about 100 nm (0.1 µm) to about 1100 nm (1.1 µm).

In step S210, the piezoelectric material 100 is separated into individual actuators 26. In particular embodiments, a dicing saw is used to dice the material 100 into individual actuators 26.

Then, in step S210, the plated and mounted slab is reversed (i.e. flipped over) and bonded to a diaphragm of a diaphragm-plus-body assembly 30, thereby forming the piezoelectric printhead 10. The intermediate substrate is then removed/unmounted from the piezoelectric printhead 10.

Figure 10A:
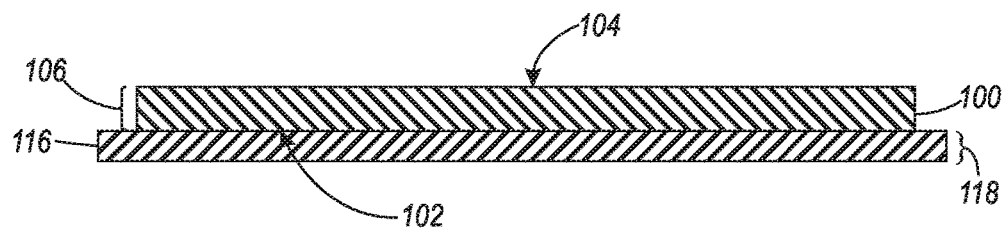
FIGS. 10A-10F illustrate a series of steps used to fabricate a piezoelectric printhead according to the method shown in FIG. 9.
Figure 10B:
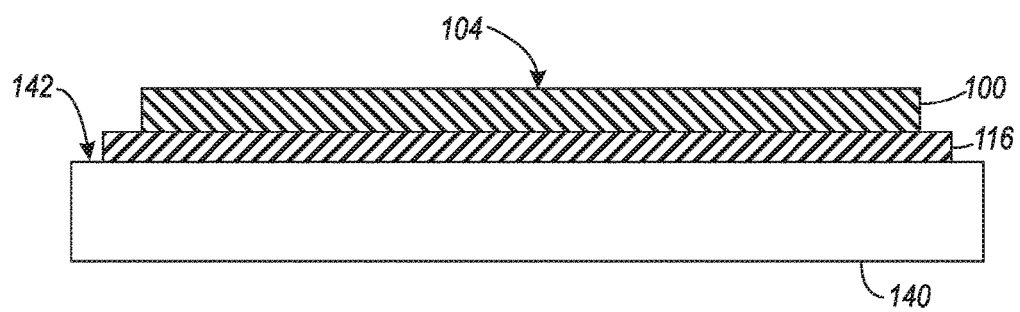
Figure 10C:
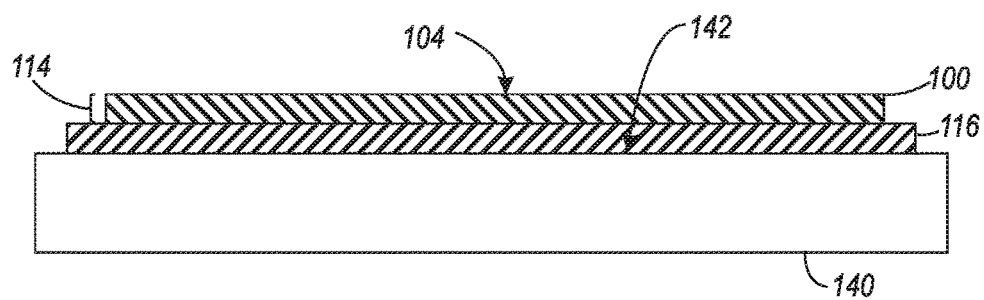
Figure 10D:
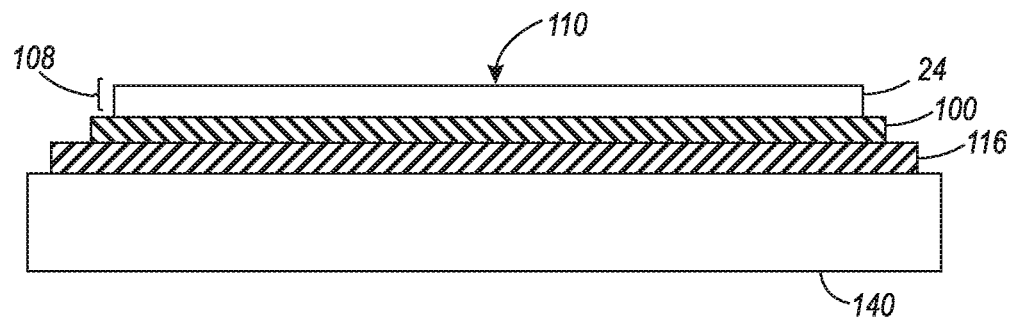
Figure 10E:
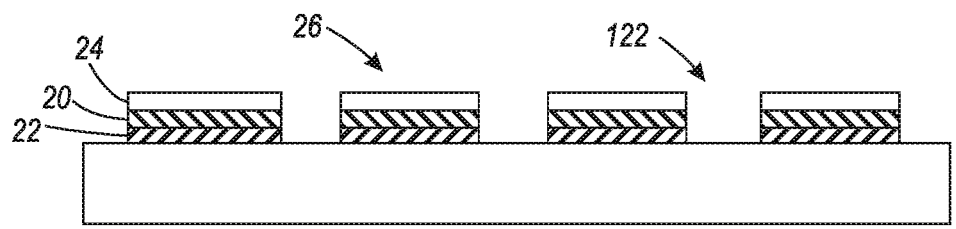
Figure 10F:
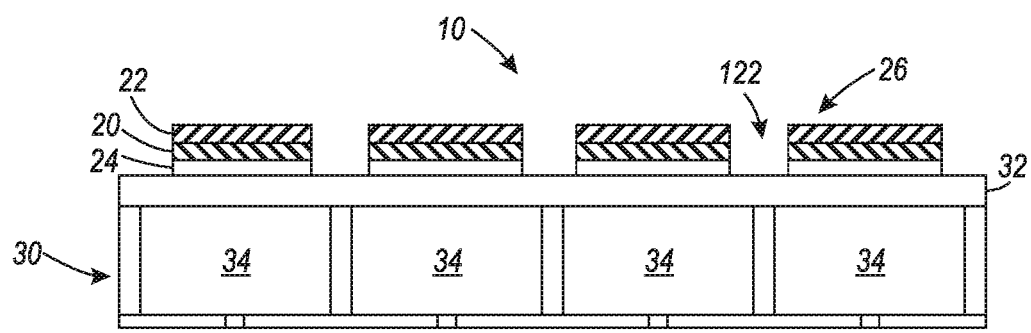

Regarding FIGS. 10A-10F, one embodiment of the method shown in FIG. 9 is shown. In FIG. 10A, a piezoelectric slab material 100 with an initial thickness 106, a first surface 102, and a second surface 104, is plated on a first side 102 to form an electrode layer 116, which can have a thickness 118 of from about 100 nm (0.1 µm) to about 1100 nm (1.1 µm). In FIG. 10B, the plated piezoelectric material 100 is mounted onto a first surface 142 of an intermediate substrate 140. In particular embodiments, the intermediate substrate 140 can be, for example, a transfer carrier or dicing tape. In FIG. 10C, the piezoelectric material 100 is thinned from thickness 106 to thickness 114. In FIG. 10D, the second surface 104 of the piezoelectric material 100 is plated with an electrode material to form a second electrode layer 24 with a top (or outer) surface 110. In FIG. 10E, a dicing operation is performed in which individual actuators 26 are isolated. Specifically, the dicing operation forms dicing streets 122 between individual actuators 26, and each actuator 26 may include a piezoelectric material layer 20 that is plated on one side with a top electrode 22 and plated on the another (or opposite) side with a bottom electrode 24. In other words, the top electrode 22 is adjacent to the piezoelectric material on one side, and the bottom electrode 24 is adjacent to the piezoelectric material on another side. Finally, in FIG. 10F, a bonding operation is performed wherein individual actuators 26 are bonded to a diaphragm 32 of a diaphragm-plus-body assembly 30, and the intermediate substrate 140 is removed/unmounted from the actuators 26, thereby forming a piezoelectric ink-jet printhead 10.

Similarly, with reference to FIG. 11, a flowchart S300 is depicted illustrating a method of fabricating a lead-free piezoelectric ink-jet printhead in accordance with a third exemplary embodiment of the subject application.

In step S302, a first surface of the slab of piezoelectric bulk material is plated to form a first electrode layer. In particular embodiments, the piezoelectric material 100 may have an initial thickness of from about 100 µm to about 300 µm.

In step S304, the plated material 100 is mounted onto a first intermediate substrate. In particular embodiments, the first intermediate substrate may be a thinning medium. In some embodiments, the thinning medium may be a wafer.

In step S306, the piezoelectric material 100 is thinned to a desired thickness using at least one of a precision surface grinder, dicing saw, or other mechanical means. In particular embodiments, the thinned piezoelectric material 100 may have a desired (or second) thickness of from about 2 µm to about 50 µm, or from about 4 µm to about 45 µm, or from 8 µm to about 40 µm, or preferably from about 10 µm to about 20 µm.

In step S308, another electrode material layer is deposited on at least a portion of a second side of the piezoelectric material 100. In particular embodiments, the second side of the piezoelectric slab 100 may be plated with the electrode material. In further embodiments, the piezoelectric slab 100 may be selectively plated such that only some of the second side is plated. The electrode material layer may be deposited using several methods, including at least plating, sputtering, or evaporation methods. For example, in particular embodiments, RF sputtering may be used to deposit nickel onto the second side of the piezoelectric material 100 to form the electrode layer. In particular embodiments, the electrode layers may have a thickness of from about 100 nm (0.1 µm) to about 1100 nm (1.1 µm).

In step S310, the plated and thinned piezoelectric material 100 is then mounted to a second intermediate substrate. In particular embodiments, the second intermediate substrate may be a transfer carrier or dicing tape.

In step S312, the plated and thinned piezoelectric material 100 is unmounted from the first intermediate substrate (i.e. thinning medium).

Then, in step S314, the plated material 100 can be diced into individual actuators 26. In particular embodiments, a dicing saw is used to isolate the individual actuators.

Then, in step S316, the plated piezoelectric material 100 is flipped and bonded to a diaphragm of a diaphragm-plus-body assembly, and the actuators 26 are removed/unmounted from the second intermediate substrate, thereby forming the piezoelectric ink-jet printhead 10. In particular embodiments, when the actuators 26 are bonded to the diaphragm, there are no intermediate layers between the piezoelectric material 100 and the diaphragm except for the electrode layer (i.e. the bottom electrode layer).

Figure 12A:
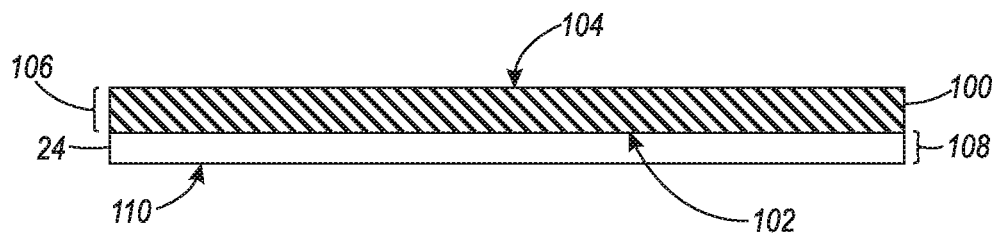
FIGS. 12A-12H illustrate a series of steps used to fabricate a piezoelectric printhead according to the method shown in FIG. 11.
Figure 12B:
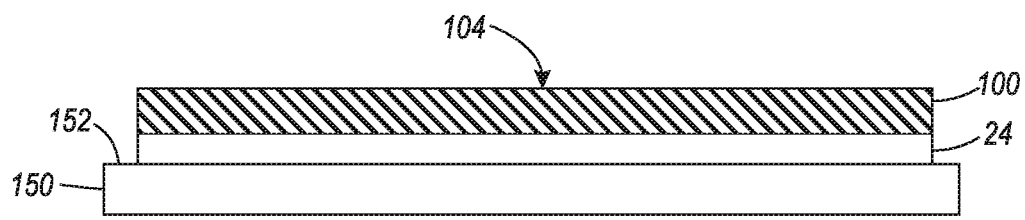
Figure 12C:
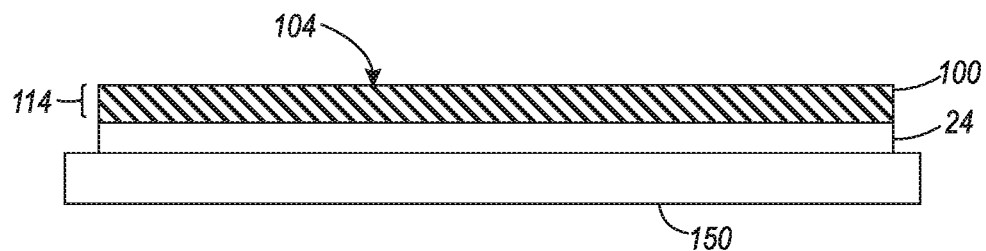
Figure 12D:
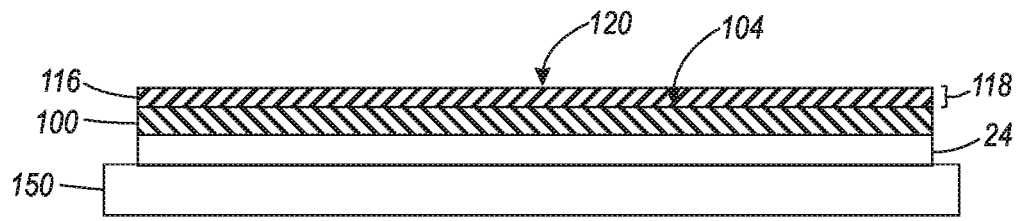
Figure 12E:
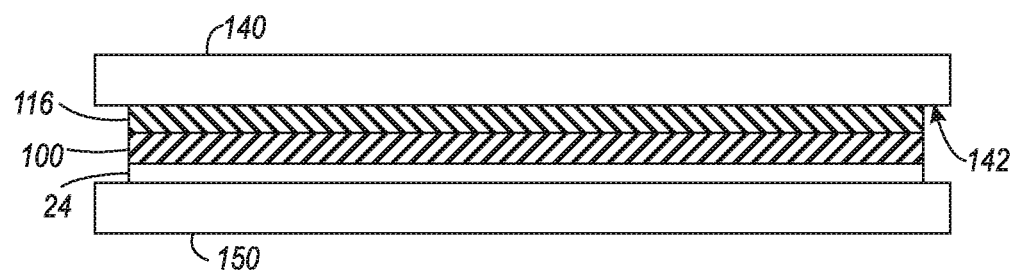
Figure 12F:
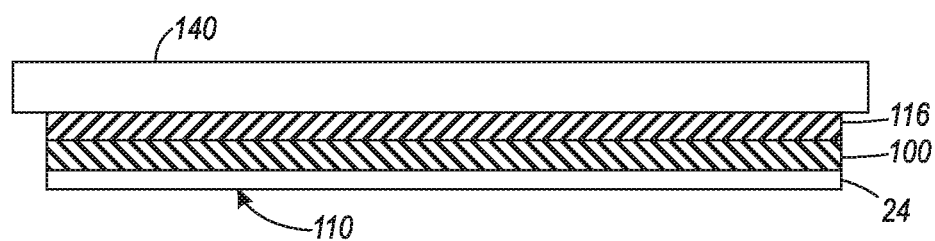
Figure 12G:
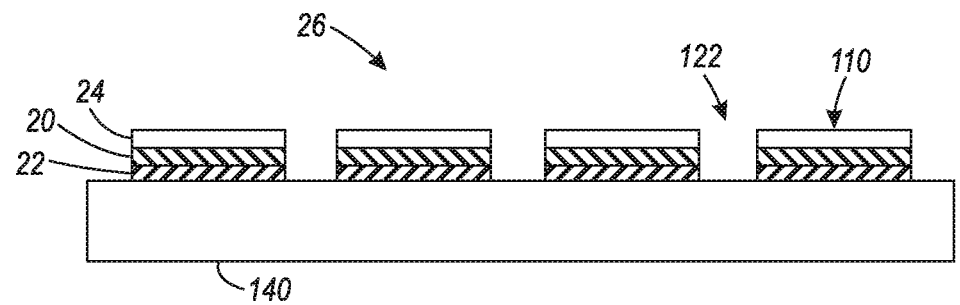
Figure 12H:
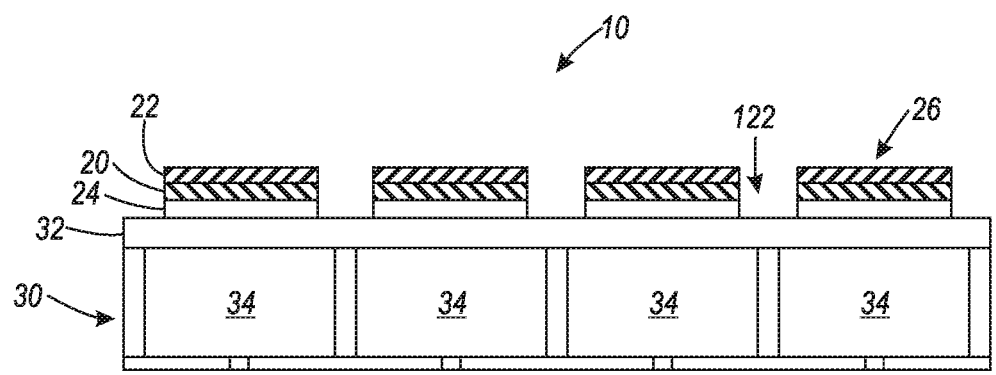

Regarding FIGS. 12A-12H, one embodiment of the method illustrated in FIG. 11 is shown. In FIG. 12A, a piezoelectric slab material 100 with an initial thickness 106, a first surface 102, and a second surface 104, is plated on a first side (i.e. the first surface 102) to form an electrode layer 24 having a thickness 108. In FIG. 12B, the plated piezoelectric material 100 is mounted onto a surface 152 of a first intermediate substrate 150. In some embodiments, when the plated piezoelectric material 100 is mounted onto the first intermediate substrate 150, surface 152 of the intermediate substrate is adjacent or contacting a surface 110 of the electrode layer 24. In particular embodiments, the first intermediate substrate 150 can be a thinning medium, for example, a wafer or a glass block. In FIG. 12C, the piezoelectric material 100 is thinned from thickness 106 to thickness 114. In FIG. 12D the surface 104 (i.e. the surface opposing surface 102 that was previously plated with electrode layer 24) of the piezoelectric material 100 is plated with an electrode material to form an electrode layer 116 having a surface 120 and a thickness 118. In FIG. 12E, the plated piezoelectric material 100 is mounted onto a second intermediate substrate 140 such that surface 120 of electrode layer 116 is adjacent and contacting surface 142 of the second substrate 140. In particular embodiments, the second intermediate substrate can be, for example, a transfer carrier or dicing tape. In FIG. 12F, the plated piezoelectric material 100 is unmounted from the first intermediate substrate 150. In FIG. 12G, the piezoelectric material 100, and electrode layers 116, 24 are diced to form individual actuators 26. As discussed above, this dicing operation forms dicing streets 122 between individual actuators 26. Finally, in FIG. 12H, the mounted actuators 26 are flipped, bonded to a diaphragm 32 of a diaphragm-plus-body assembly 30, and removed/ unmounted from the second intermediate substrate 140, thereby forming the piezoelectric ink-jet printhead 10.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A piezoelectric ink-jet printhead comprising:
   a diaphragm;
   a plurality of piezoelectric actuators, each actuator comprising a lead-free piezoelectric material, a first electrode adjacent to a first side of the piezoelectric material, and a second electrode adjacent to a second side of the piezoelectric material;
   at least one nozzle;
   at least one body chamber; and
   a drive circuit that generates an electrical signal across one or more of the plurality of piezoelectric actuators;
   wherein the piezoelectric material comprises bismuth potassium titanate (BNKT) and at least one of bismuth magnesium titanate (BMT) and niobium potassium sodium (KNN).

2. The piezoelectric ink-jet printhead of claim 1, wherein the piezoelectric material comprises from about 90 mol % to about 99.9 mol % BNKT.

3. The piezoelectric ink-jet printhead of claim 2, wherein the piezoelectric material comprises from about 0 mol % to about 10 mol % of at least one of BMT and KNN.

4. The piezoelectric ink-jet printhead of claim 1, wherein the electrical signal generated across the one or more of the plurality of piezoelectric actuators by the drive circuit operates the piezoelectric actuators at an electric field at or above the coercive field or a field induced phase transition point for the piezoelectric material.

5. The piezoelectric ink-jet printhead of claim 1, wherein the piezoelectric material has a thickness of between 2 μm and 50 μm.

6. The piezoelectric ink-jet printhead of claim 1, wherein the electrical signal generated across the one or more of the plurality of piezoelectric actuators by the drive circuit is between 3 and 10 volts/μm.

7. The piezoelectric ink-jet printhead of claim 1, wherein the diaphragm is a steel diaphragm.

8. The piezoelectric ink-jet printhead of claim 1, wherein the diaphragm has a thickness of between about 2 μm and about 30 μm.

9. The piezoelectric ink-jet printhead of claim 1, wherein the piezoelectric material has a thickness of at least 50 μm when first attached to the diaphragm, and is subsequently thinned to a thickness of between about 2 μm and about 30 μm.

10. The piezoelectric ink-jet printhead of claim 9, wherein the piezoelectric material is thinned using at least one of a precision surface grinder, a dicing saw, and a polishing wheel.

11. The piezoelectric ink-jet printhead of claim 1, wherein the electrical signal generated across the one or more of the plurality of piezoelectric actuators has a bias such that the voltage level in one direction is at least 1.5 times the absolute value of the voltage applied in the opposite direction.

12. The piezoelectric ink-jet printhead of claim 1, wherein the electrical signal generated across the one or more of the plurality of piezoelectric actuators has a bias such that the voltage level in one direction is at least 2 times the absolute value of the voltage applied in the opposite direction.

13. The piezoelectric ink-jet printhead of claim 1, wherein the electrical signal generated across the one or more of the plurality of piezoelectric actuators has a bias such that the voltage applied is completely in one direction.

* * * * *